US010885513B2

(12) United States Patent
Van Wiemeersch et al.

(10) Patent No.: US 10,885,513 B2
(45) Date of Patent: Jan. 5, 2021

(54) IN-VEHICLE BANKING ENABLED BY NEAR FIELD COMMUNICATION

(71) Applicant: Ford Global Technologies, LLC, Dearborn, MI (US)

(72) Inventors: John Robert Van Wiemeersch, Novi, MI (US); Patrick Kevin Holub, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 16/083,531

(22) PCT Filed: Mar. 10, 2016

(86) PCT No.: PCT/US2016/021657
§ 371 (c)(1),
(2) Date: Sep. 10, 2018

(87) PCT Pub. No.: WO2017/155530
PCT Pub. Date: Sep. 14, 2017

(65) Prior Publication Data
US 2019/0034915 A1    Jan. 31, 2019

(51) Int. Cl.
*G06Q 20/34* (2012.01)
*G06Q 20/10* (2012.01)
(Continued)

(52) U.S. Cl.
CPC ......... *G06Q 20/352* (2013.01); *G06Q 20/108* (2013.01); *G06Q 20/3278* (2013.01); *G07F 19/202* (2013.01); *G07F 19/203* (2013.01)

(58) Field of Classification Search
CPC .... G06Q 20/1085; G06Q 40/00; H04W 4/023
See application file for complete search history.

(56) References Cited

U.S. PATENT DOCUMENTS 7,035,822 B1    4/2006    Kit
7,946,477 B1    5/2011    Ramachandran et al.
(Continued)

FOREIGN PATENT DOCUMENTS

CA          2765806 A1 *  7/2012  ............. G07F 19/20
KR    2014-0083322 A  *  7/2014  ............. G07F 19/00
(Continued)

OTHER PUBLICATIONS

Merritt, C., "Mobile Money Transfer Services: The Next Phase in Evolution in Person-to-Person Payments", Retail Payment Risk Form White Paper, Federal Reserver Bank of Atlanta (Aug. 2010) (Year: 2010).*

(Continued)

*Primary Examiner* — Daniel S Felten
(74) *Attorney, Agent, or Firm* — Gregory P. Brown; Brooks Kushman P.C.

(57) ABSTRACT

An automated teller machine includes a controller. The controller may be configured to transmit via inductive coupling a session key in response to receiving a signal from a nomadic device. The controller may then establish a connection with a vehicle infotainment system (VIS) using the session key and receive from the VIS, a PIN number and a request to dispense funds via the connection. After which, the controller may inhibit release of the funds until a confirmation is received via inductive coupling from the nomadic device.

18 Claims, 6 Drawing Sheets

(51) Int. Cl.
*G07F 19/00* (2006.01)
*G06Q 20/32* (2012.01)

(56) References Cited

U.S. PATENT DOCUMENTS

| | | | |
|---|---|---|---|
| 8,494,937 B2 * | 7/2013 | Berntsen | G06Q 20/10 |
| | | | 235/379 |
| 8,736,438 B1 | 5/2014 | Vasquez et al. | |
| 2011/0055084 A1 | 3/2011 | Singh | |
| 2011/0153115 A1 | 6/2011 | Inderrieden et al. | |
| 2012/0172010 A1 | 7/2012 | Oman et al. | |
| 2013/0196711 A1 | 8/2013 | Behin | |
| 2013/0254109 A1 | 9/2013 | Beiser et al. | |
| 2014/0279491 A1 | 9/2014 | Martin et al. | |
| 2014/0279565 A1 | 9/2014 | Trump et al. | |
| 2014/0376721 A1 | 12/2014 | Perez et al. | |
| 2016/0071076 A1 * | 3/2016 | Pochic | G06Q 30/06 |
| | | | 705/43 |
| 2019/0149611 A1 * | 5/2019 | Mueller | H04L 67/125 |
| | | | 455/456.1 |
| 2019/0149612 A1 * | 5/2019 | Mueller | H04L 67/125 |
| | | | 455/456.1 |

FOREIGN PATENT DOCUMENTS

| | | | | |
|---|---|---|---|---|
| KR | 20150061721 A | 6/2015 | | |
| KR | 20150061721 | * | 10/2015 | G06Q 20/1085 |
| WO | WO-2011119389 A2 * | 9/2011 | | G06Q 20/322 |

OTHER PUBLICATIONS

Aker J. C., and Mbiti, M., "Mobile Phones and Economic Developement in Africa" Journal of Economic Perspectives, vol. 24, No. 3, (Summer 2010) pp. 207-232 (Year: 2010).*

* cited by examiner

IN-VEHICLE BANKING ENABLED BY NEAR FIELD COMMUNICATION

CROSS-REFERENCE TO RELATED APPLICATION

This application is the U.S. national phase of PCT Application No. PCT/US2016/021657 filed Mar. 10, 2016, the disclosure of which is hereby incorporated in its entirety by reference herein.

TECHNICAL FIELD

This application is generally related to authenticating a connection between a vehicle system and a banking system using near field communication.

BACKGROUND

Advancing vehicular computing to further improve the driving experience has long been a goal of the automotive industry. Integrated systems provide for hands-free calling, on-demand media delivery, streaming audio service integration and a wealth of navigation and other features. There are, however, always opportunities for expansion. Vehicle systems are not commonly integrated with the world surrounding the vehicle. In several examples, attempts have been made to facilitate extra-vehicular system access within the vehicle.

SUMMARY

An automated teller machine includes a controller. The controller may be configured to transmit via inductive coupling a session key in response to receiving a signal from a nomadic device. The controller may then establish a connection with a vehicle infotainment system (VIS) using the session key and receive from the VIS, a PIN number and a request to dispense funds via the connection. After which, the controller may inhibit release of the funds until a confirmation is received via inductive coupling from the nomadic device.

A method of operating an ATM from a vehicle infotainment system (VIS) includes transmitting a session key to a nomadic device paired with the VIS and proximate with the ATM, establishing a connection between the ATM and the VIS using the session key, receiving a request to dispense funds from the VIS, and inhibiting release of the funds until reception of a confirmation from the nomadic device while proximate to the ATM.

A vehicle infotainment system includes a display, first and second wireless transceivers, and a controller. The controller may be configured to, upon receiving an NFC generated session key from a paired device via the first wireless transceiver, establish a secure link via the second wireless transceiver with a banking system using the session key, and operate a graphical user interface on the display to receive a PIN number to authorize access to a bank account.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof, and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Drive-through automated teller machines (ATMs) can be difficult to use and/or reach from a vehicle due to a variety of conditions. The variety of conditions include a wide range of vehicle heights relative to the ATM, a customer's reach, an ability to park a vehicle close enough to the ATM, a wash out of the ATM display due to sun light, and other general inconveniences. The use of an application or graphical user interface GUI on an in-vehicle infotainment system using BLUETOOTH or Wi-Fi to facilitate communication between the external ATM and in-vehicle system has been considered. However, due to a range of BLUETOOTH Classic (typically 10-30 meters), BLUETOOTH Low Energy (typically 50-100 m), and Wi-Fi (typically 30 m), a challenge exists of ensuring that a secure connection is made with the correct vehicle and that the customer is physically at the ATM (not one car behind or adjacent). Another concern is that the right customer is ready to insert their envelope or accept cash when an ATM transaction involves depositing or dispensing cash.

Here, a solution to the above stated problem includes the use of close range communication along with longer range communication. Close range communication is communication limited to lengths less than 30 cm, typically the close range communication is limited to 10 cm, 5 cm or less. The close range communication may include near field communication (NFC) (e.g., an NFC Phone or NFC Wearable) or other customized or private RFID based tight range communication solutions may also be employed to achieve the same benefits obtained with the commercially ubiquitous NFC solution. From this point forward, all examples with be using NFC. The NFC Phone or Wearable is used to initiate and conclude the in-vehicle ATM session by an NFC trigger event at the external ATM. In the most common use case, a user would pull up to the ATM and pass their wearable or phone near an NFC transceiver located in the exterior ATM. This would initiate passing of an unique BLUETOOTH or Wi-Fi session ID code from the exterior ATM to the wearable via NFC and then to the vehicle (or from the wearable to a paired phone then to the vehicle via the wearable's and phone's pre-established BLUETOOTH or Wi-Fi pairing). The ATM-to-Vehicle link could also be done with just an NFC phone paired to the vehicle. The NFC event ensures the bank or ATM sends a secure link only to the vehicle parked at the ATM. Once a session is open, all ATM Graphical User Interface (GUI) functions would be mirrored on the vehicle center screen over Wi-Fi so the customer can select and control the ATM using the in-vehicle GUI. The exterior ATM panel may be blanked to hide any transaction buttons or details. Also, the exterior ATM panel and input buttons may be disabled to provide added security. Once done, the customer may terminate the session from the in-vehicle display. If the customer expects a cash withdraw, the customer may select a "cash pending and close button" on the in-vehicle display and then reach out to the cash dispenser that will dispense cash only if it senses the NFC device. Once cash is dispensed, the ATM session closes.

This disclosure, among other things, proposes systems and methods for authenticating a GUI on a display of a vehicle infotainment system to control a transaction on a bank ATM proximate to the vehicle. Here, a remote nomadic device connects via close range communication with an ATM to obtain a session key. The remote nomadic device may be a mobile phone, a cellular phone, an electronic tablet, an electronic watch, an electronic wrist band, an electronic ring, an identification module embedded subcutaneously, an electronic card, a smart card, a credit card, a bank fob, or other portable device configured to communicate with the ATM via close range communication. The close range communication may utilize inductive coupling, radio frequency (RF) electronic coupling, ultrasonic audio coupling, light based coupling, or other electronic coupling.

For example, inductive coupling may include coupling via NFC, RF electronic coupling may include coupling via radio frequency identification (RFID), and another electronic coupling may include coupling via infrared data association (IrDA) or ultrasonic communication. The close range communication may be limited to a predetermined distance such as 5 cm, 10 cm, or may even make a connection across a 30 cm distance between the ATM and nomadic device. Along with the ability to communicate with the ATM, the nomadic device must also be paired with the vehicle infotainment system. The pairing of the nomadic device with the vehicle infotainment device may use a communication protocol separate from the close range communication. For example, the nomadic device may be paired with the vehicle infotainment system via BLUETOOTH, Wi-Fi, ultra-wideband (UWB), or other wireless communication protocol.

In one embodiment, the nomadic device is inductively coupled with an antenna loop of the ATM via NFC. Generally, NFC must be at a distance of no more than 20 cm, but typically is around 5 cm, between the nomadic device and the antenna loop of the ATM. While the nomadic device is within the predetermined close range distance of the antenna loop of the ATM, the nomadic device and the ATM may communicate. The communication between the nomadic device and the antenna loop may include modulated signals indicative of an associated connection request from the nomadic device to the ATM and a secure session key sent from the ATM to the nomadic device. The associated connection request may include a media access control (MAC) address, a Wi-Fi port, a secure ad-hoc connection address, or other unique identifier to distinguish a request from the vehicle infotainment system from other requests. The secure session key may include a secure ad-hoc connection address, a rolling code, an encrypted session key, or other security schemes to allow remote access and control of the ATM. However, the remote access and control of the ATM via the session key is limited to data entry, such as requests to view account balances, transfer of funds, verification of the session using a personal identification number (PIN), a request to make a deposit, and a request to withdraw funds. Once a request to withdraw funds is received, the ATM may prepare the funds/cash by counting it and preparing to output the funds/cash. The ATM, however, may retain the cash/funds until another close range communication message is verified between the nomadic device and the ATM. This requires that the same device used to initiate the banking transaction be presented within the predetermined close range (in this example nearfield communication of approximately 20 cm) of the ATM after a request for funds is sent by the vehicle infotainment system via the GUI. This safeguards the funds such that if the driver of the vehicle feels threatened prior to the last NFC based communication, they could drive off and the funds would remain secure in the ATM.

An in-vehicle infotainment system or nomadic device (i.e. Phone or Tablet) performing the ATM GUI may translate commands such that the ATM displays options in a language selected by user of the in-vehicle infotainment system or nomadic device. For example, if a language selection of an in-vehicle infotainment system is set to Spanish, the in-vehicle ATM may translate commands and options to Spanish. Also, the ATM GUI may have an option to select a destination for a receipt of the transaction. Then, the in-vehicle infotainment system could send an e-receipt to a user's email account acquired from a link shared with the bank ATM once the BLUETOOTH, Wi-Fi, Wi-Max, DSRC or other suitable protocol session established. The e-receipt may contain a photo of the vehicle and/or driver taken by security cameras used in the ATM. And, during an in-vehicle ATM session, the bank ATM could transmit and record an image of the vehicle using the bank ATM camera to allow confirmation that the ATM is linked with your vehicle or it could air bank commercials.

Figure 1A:
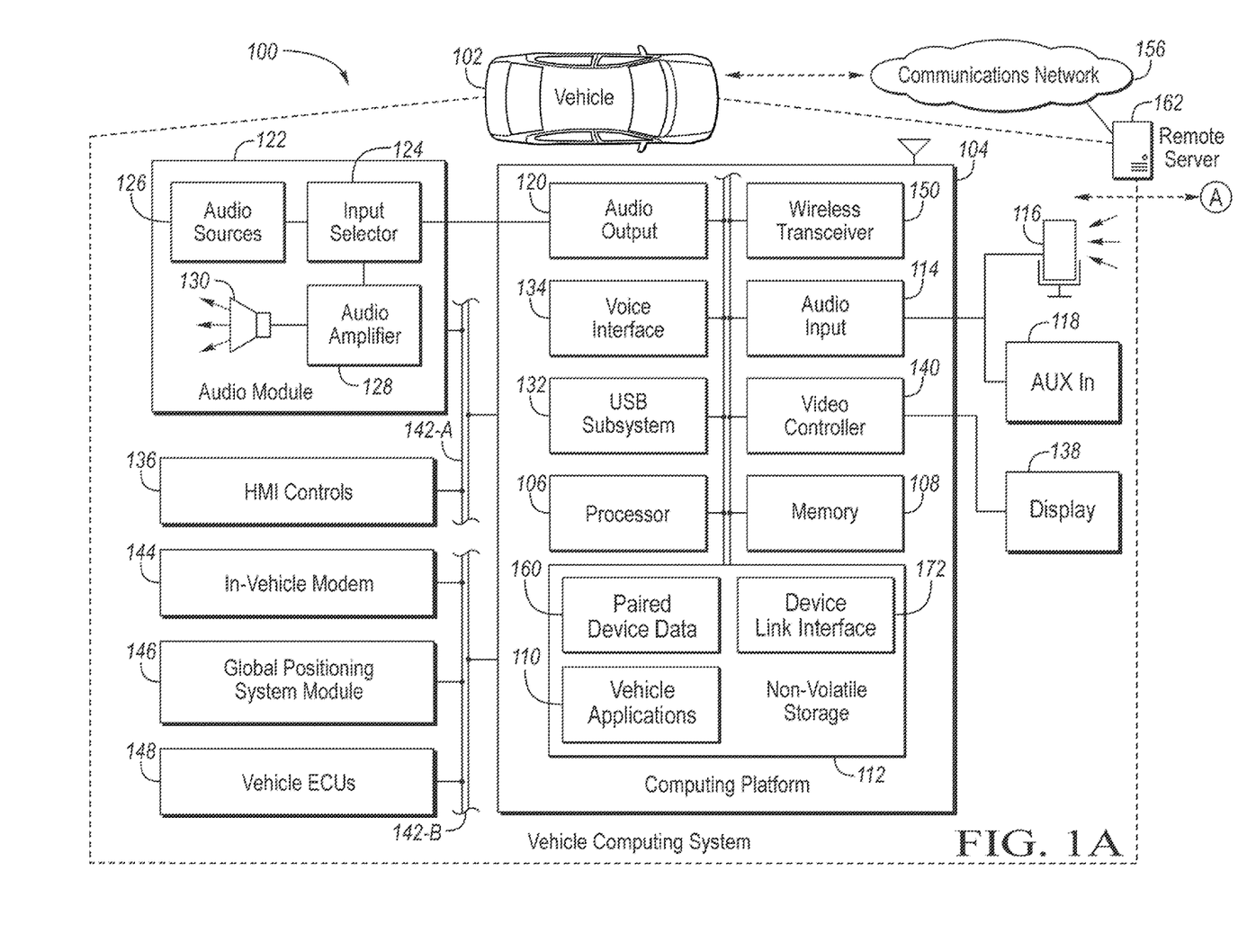
FIGS. 1A and 1B are a block diagram of a vehicle infotainment system.

FIG. 1A illustrates an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a motorcycle, an eBike, a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor may also be multiple processors in multiple computing units, which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

Figure 1B:
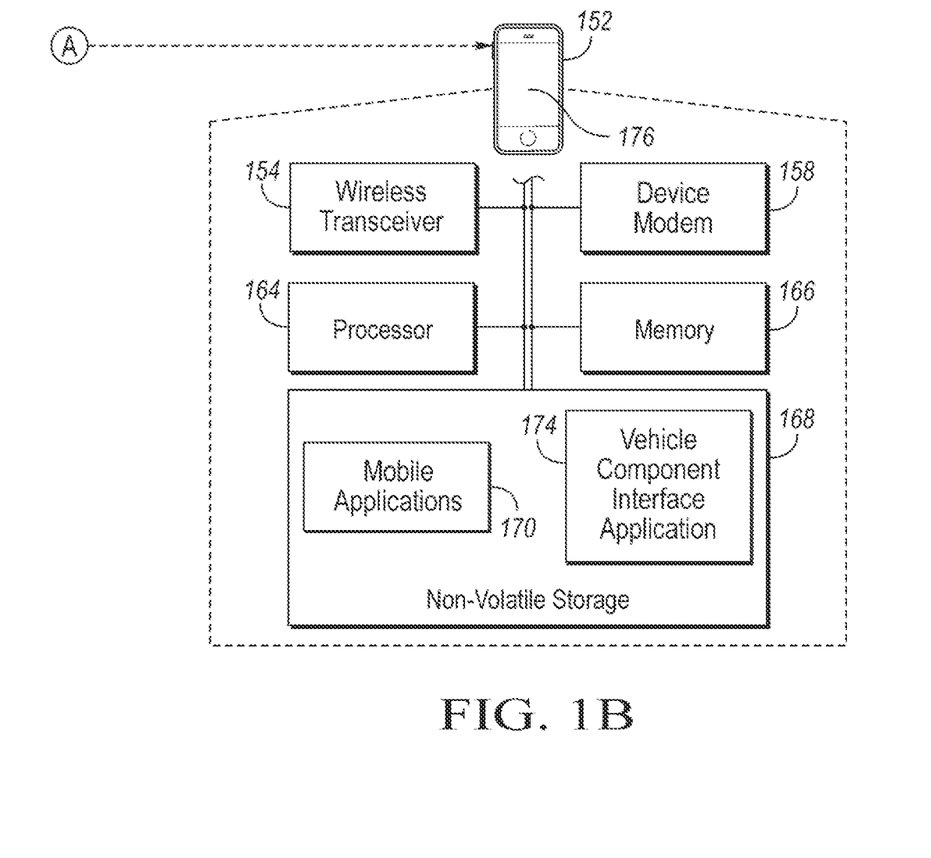

As shown in FIG. 1B, the computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while Wi-Fi and BLUETOOTH may operate over a broadband of several dozen narrow frequencies around 2.4 GHz. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134. The device link interface 172 may also provide the mobile applications 170 with access to vehicle information available to the computing platform 104 via the in-vehicle networks 142. An example of a device link interface 172 may be the SYNC APPLINK component of the SYNC system provided by The Ford Motor Company of Dearborn, Mich.

Figure 2:
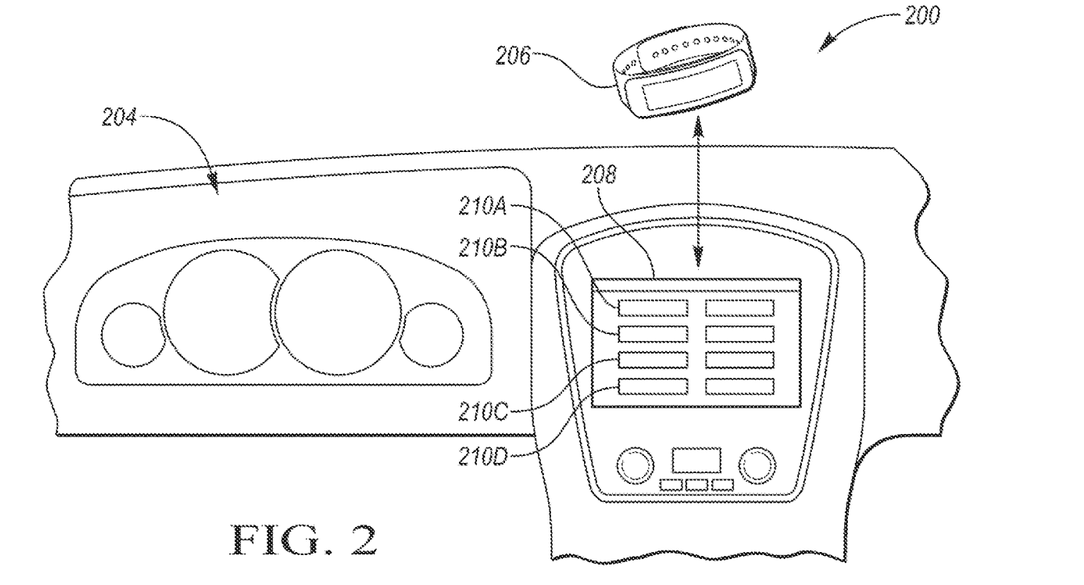
FIG. 2 is an illustration of a vehicle dashboard showing a graphical user interface for interfacing with a bank ATM.

FIG. 2 is an illustration of a remote in-vehicle banking system 200 including an instrument cluster 204, a nomadic device 206 and an in-vehicle infotainment system 208. The instrument cluster 204 may include a controller and a display that is configured to execute applications and provide an input/output interface such as a GUI that may use voice commands or buttons such as steering wheel buttons for input and the display for output. Alternatively the in-vehicle infotainment system 208 may include a controller and a display that is configured to execute applications and provide an input/output interface such as a graphical user interface (GUI) that may use a touch screen, voice commands or buttons for input and may use the display for output. The GUI may include virtual buttons 210 comprising the illumination of an image of button or section of the display associated with a touch screen configured to detect proximity of a finger with the display at a location associated with the image. For example, a first location 210A may display "Fast Cash $100", a second location 210B may display "Cash Withdrawal", a fourth location 210C may display "Balance Inquiry" and a fifth location 210D may display "Transfer Funds".

Figure 3:
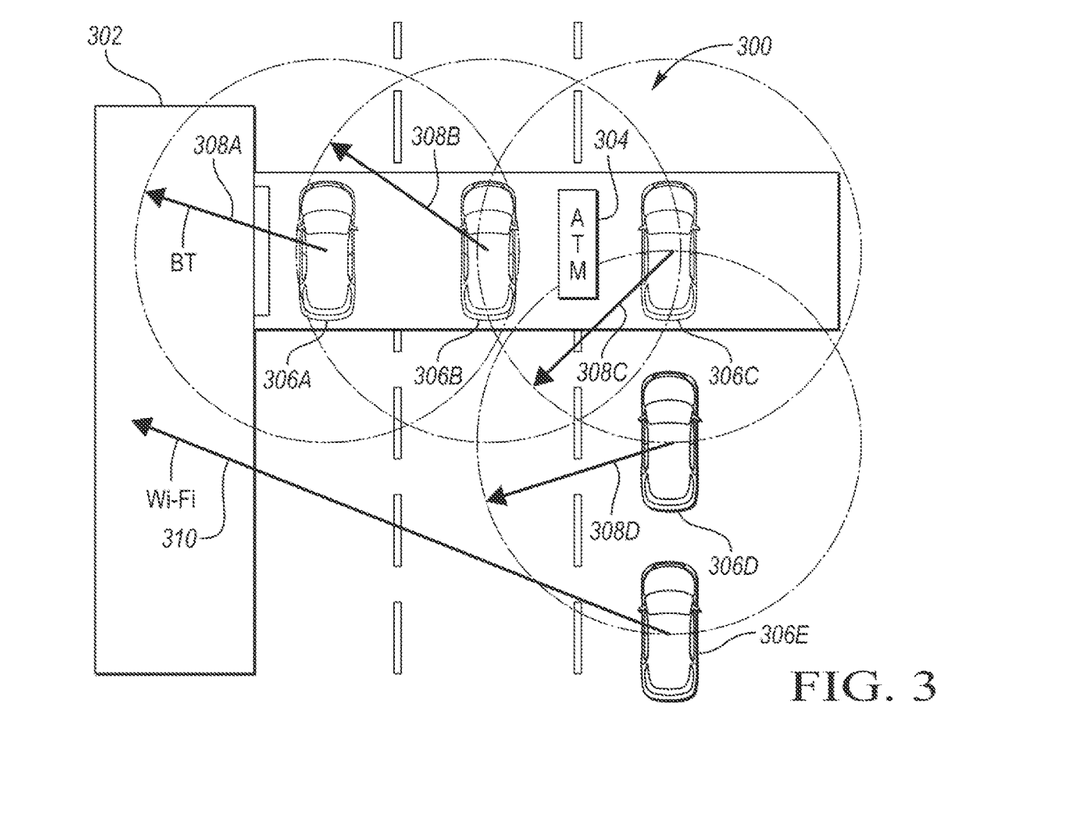
FIG. 3 is an overhead view of multiple vehicles at a bank drive thru and automated teller system (ATM) illustrating ranges of wireless devices.

FIG. 3, is an overhead view of a banking system 300 including multiple vehicles 306 at a bank drive thru and ATM 304 illustrating ranges 308, 310 of wireless devices. Here, a bank 300 includes a bank drive thru configured to allow multiple bank transactions to be handled concurrently. Typically, a bank drive thru has a first lane with an exterior window having a drawer to allow transactions between the teller and a first passenger of a first vehicle 306A. The passenger of the first vehicle 306A may have a wireless device (e.g., a BLUETOOTH enabled device) that has a first range 308A. A second lane having a second passenger in a second vehicle 306B may have a wireless device (e.g., a BLUETOOTH enabled device) that has a second range 308B. The second lane does not contain a drawer to interact with the teller, but instead typically includes a pneumatic air tube in conjunction with an intercom. Typically, the second lane allows a teller to see the passenger of the second vehicle 306B and only requires an intercom to communicate with the passenger of the second vehicle. The use of the pneumatic air tube in the second lane allows the transportation of items between the teller and the second passenger. A third lane having a third passenger in a third vehicle 306C may have a wireless device (e.g., a BLUETOOTH enabled device) that has a third range 308C and a fourth passenger in a forth vehicle 306D may have a wireless device (e.g., a BLUETOOTH enabled device) that has a forth range 308D. In this example, the third lane has an ATM 304. In this illustration, the overlap of medium range RF signals is shown, where the medium range RF signal has a range of approximately 10 meters but can be greater if BLUETOOTH low energy is used. Due to the overlap of signals, the security of a transaction initiated using medium range RF signals with the ATM may be compromised. The compromise includes identity theft such as copying of the signals and reproducing them or a subset of the signals at a later time to obtain funds from the ATM. Further, the use of a long range wireless protocol such as Wi-Fi as shown with vehicle 306E having a transceiver with a Wi-Fi range 310 is susceptible to overlap of the RF signals and a potential security risk. In summary, the use of a medium to long range wireless protocol is susceptible to security risks resulting from targeting of the wrong customer for cash dispensing.

Here, the use of close range communication such as nearfield communication between a passenger in the vehicle 306C and the ATM 304 may be used to add additional security. The use of NFC requires the NFC transceiver to be within 20 cm of the antenna loop of the ATM to be read, and in some instances, the range may intentionally be configured to be less. For example, the range may be intentionally limited to 10 cm so that information from the NFC transceiver is protected from possible thieves attempting to obtain the information. By placing the NFC transceiver within a 10 cm distance from the antenna loop of the ATM, a secure connection may be made and a session key may be transferred from the ATM 304 to the NFC transceiver associated with a specific vehicle 306C. Once a secure connection is made between the NFC transceiver and the ATM 304, data may be transferred between the ATM 304 and the NFC transceiver. Here, the use of the term NFC transceiver includes any of the nomadic devices previously described including an NFC transceiver, and the term "NFC transceiver" is exemplary as other close range communication methods may be used. Further, in the event that the close range communication is a close range RF communication, the nomadic devices may include a second RF transceiver that operates at a frequency separate and distinct from the close range communication. For example, the close range communication may be less than 50 MHz (e.g., 13.56 MHz) while the medium to long range communication is at greater than 500 MHz (e.g., 800 MHz). Once the session key is received by the nomadic device, the session key may be transferred to an in-vehicle infotainment system of the associated vehicle 306C via the medium to long range communication. In this example, the nomadic device has been previously paired with the in-vehicle infotainment system and forms a secure wireless link there between. With the session key from the nomadic device, the infotainment system may initiate a connection with the ATM 304 over a third communication that may be different from the close range communication between the nomadic device and the ATM 304 and the medium to long range communication between the nomadic device and the in-vehicle infotainment system. For example, the close range communication between the nomadic device and the ATM 304 may be NFC, the medium to long range communication between the nomadic device and the in-vehicle infotainment system may be BLUETOOTH, and the third communication between the in-vehicle infotainment system and the ATM 304 may be Wi-Fi or cellular data.

Figure 4:
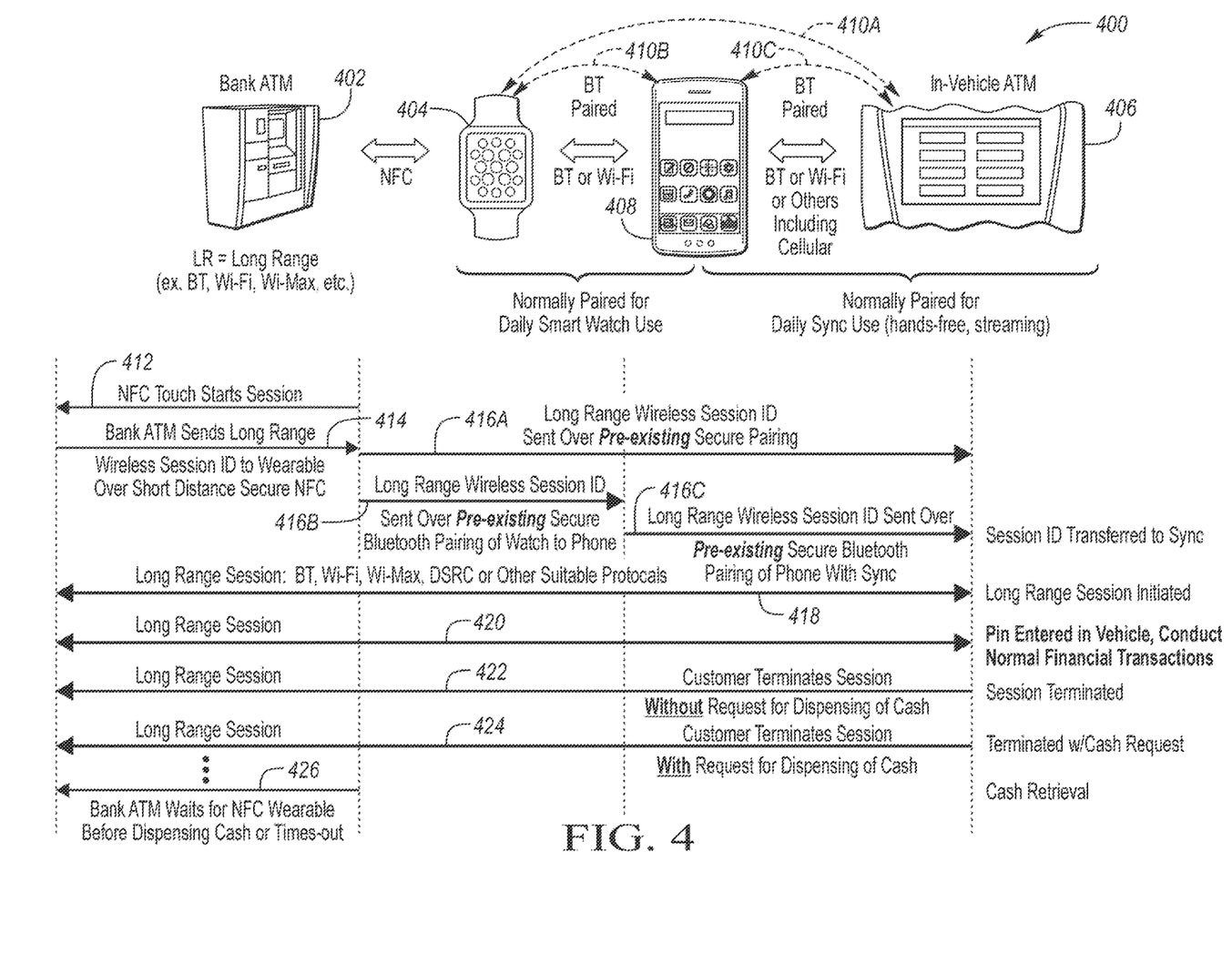
FIG. 4 is a communication flow diagram of an in-vehicle graphical user interface for a vehicle mounted remote ATM using a wireless communication system, a phone, and wearable.

FIG. 4, is a communication flow diagram of an in-vehicle graphical user interface for a remote automated teller system (ATM) using a wireless communication system. The wireless communication system 400 includes multiple wireless interfaces and transceivers such as NFC, BLUETOOTH, IEEE 802.11 (Wi-Fi), and cellular transceivers. The communication system 400 allows a bank ATM 402 to be coupled with a nomadic device, shown here as a smart watch 404 that may then be directly coupled with an in-vehicle infotainment system 406. Alternatively, the smart watch 404 may be coupled with the in-vehicle infotainment system 406 via an intermediary device such as a mobile phone 408. The smart watch 404 and the in-vehicle infotainment system 406 may be paired such that communication 410A occurs directly. Alternatively, the smart watch 404 may be paired with the mobile phone 408 such that communication 410B occurs and the communication is then relayed or the message is passed from the mobile phone 408 to the in-vehicle infotainment system 406 by communication 410C.

In step 412, a nomadic device such as the smart watch 404 is placed in close proximity to the ATM 402. The close proximity is a close range such as 10 cm or some length less than 20 cm, in some embodiments, the close range may be 5 cm or less. When the smart watch 404 is placed within this close range, an NFC based communication session may be initiated. The initiation may include the smart watch 404 sending identifying information to the ATM 402.

In step 414, the ATM 402 sends a long range session ID to the smart watch 404 over the close range communication protocol. The long range session ID may include a session key, a secure URL, an encrypted message, or other data to assist in forming a secure connection between the in-vehicle infotainment system 406 and the ATM 402. In step 416A, the long range session ID is sent by the smart watch 404 directly to the in-vehicle infotainment system 406. In step 416B and 416C, the long range session ID is sent by the smart watch 404 to an intermediary device (mobile phone 408) and then the intermediary device (mobile phone 408) sends the long range session ID to the in-vehicle infotainment system 406.

In step 418, a long range session is initiated between the ATM 402 and the in-vehicle infotainment system 406 using the session ID received by the smart watch 404 in step 414. The long range session may use BLUETOOTH, 802.11 (Wi-Fi), Wi-Max, dedicated close range communication (DSRC), or other suitable protocol. The long range session is a secure connection in that data may be encrypted to prevent fraud or theft. At this point, access to financial records or funds is not permitted.

In step 420, the long range session is used to operatively couple a graphical user interface (GUI) of the in-vehicle infotainment system 406 with the ATM 402. The GUI of the in-vehicle infotainment system 406 may prompt a passenger in the vehicle to enter a personal identification number (PIN) along with the session ID and banking information such that the ATM 402 grants the in-vehicle infotainment system 406 access to financial records. Here, the passenger may enter a command for the ATM 402 using the GUI of the in-vehicle infotainment system 406.

In step 422, the session is terminated without a request to withdraw funds from the ATM 402. The termination may include entry of a command to terminate the session on the GUI of the in-vehicle infotainment system 406, a signal from a brake pedal indicative of removal of force on the brake pedal while a transmission of the vehicle is in a drive mode, a signal indicative of movement of a transmission gear selector from park to drive, or a speed sensor of the vehicle exceeding a threshold (e.g., 3 mph or 5 mph).

In step 424, the session is terminated with a request to withdraw funds from the ATM 402. The termination may include entry of a command to withdraw funds and terminate the session on the GUI of the in-vehicle infotainment system 406. Upon receiving this command, the ATM 402 may retain the funds within the ATM 402 pending step 426. In the event that the termination is not a command based termination, such as a signal from the vehicle specifically from a brake pedal sensor indicative of removal of force on the brake pedal while a transmission of the vehicle is in a drive mode, a signal indicative of movement of a transmission gear selector from park to drive, or a speed sensor of the vehicle exceeding a threshold (e.g., 3 mph or 5 mph), the ATM 402 may retain the funds, cancel the withdraw command, and terminate the session.

In step 426, upon the ATM 402 receiving a command to withdraw funds from the GUI of the in-vehicle infotainment system 406, the ATM 402 may enter that command and prepare to release the funds. Although prepared to release the funds, the ATM 402 may retain the funds securely until the ATM 402 receives a NFC signal from the smart watch 404 that initiated the session. Upon receiving the NFC signal from the smart watch 404, the ATM 402 may release the funds.

Figure 5:
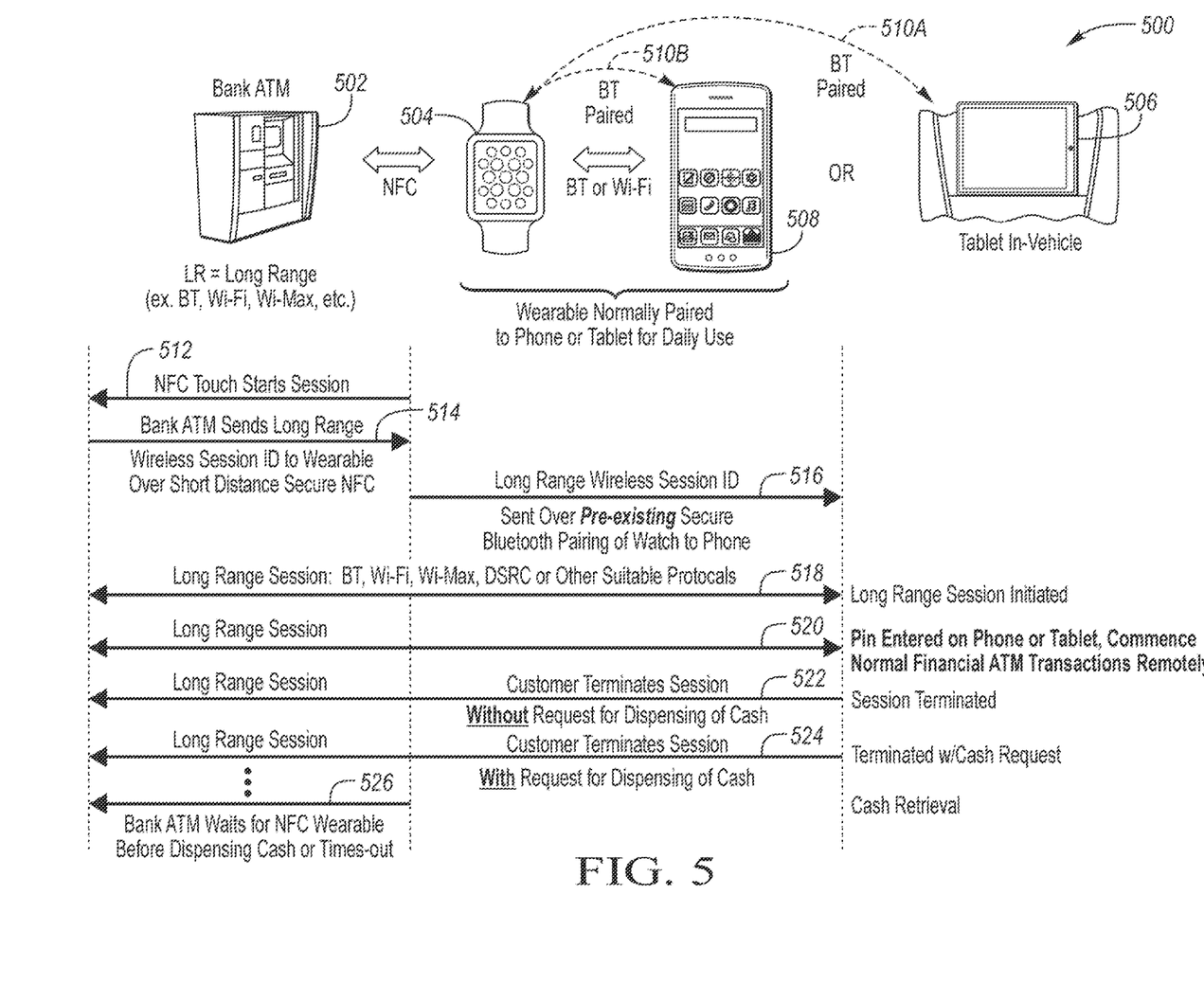
FIG. 5 is a communication flow diagram of an in-vehicle graphical user interface for a remote tablet or phone based ATM using a wireless communication system, a phone, and wearable.

FIG. 5, is a communication flow diagram of an in-vehicle graphical user interface for a remote automated teller system (ATM) using a wireless communication system. The wireless communication system 500 includes multiple wireless interfaces and transceivers such as NFC, BLUETOOTH, IEEE 802.11 (Wi-Fi), and cellular transceivers. The communication system 500 allows a bank ATM 502 to be coupled with a nomadic device, shown here as a smart watch 504 that may then be directly coupled with another nomadic device within the vehicle such as a tablet 506. Alternatively, the smart watch 504 may be coupled with a mobile phone 508. The smart watch 504 and the tablet 506 may be paired such that communication 510A occurs directly. Alternatively, the smart watch 504 may be paired with the mobile phone 508 such that communication 510B occurs. Since the solution shown here in FIG. 5. does not directly involve the vehicle mounted center screen, it offers new advantages such as the ability to operate the in-vehicle remote ATM from a $2^{nd}$ or $3^{rd}$ row seating position and it can be run in any vehicle, new or old, regardless if the vehicle is sold or equipped with the in-vehicle ATM.

In step 512, a nomadic device such as the smart watch 504 is placed in close proximity to the ATM 502. The close proximity is a close range such as 10 cm or some length less than 20 cm. In some embodiments, the close range may be 5 cm or less. When the smart watch 504 is placed within this close range, an NFC based communication session may be initiated. The initiation may include the smart watch 504 sending identifying information to the ATM 502.

In step 514, the ATM 502 sends a long range session ID to the smart watch 504 over the close range communication protocol. The long range session ID may include a session key, a secure URL, an encrypted message, or other data to assist in forming a secure connection between the in-vehicle tablet 506 and the ATM 502. In step 516, the long range session ID is sent by the smart watch 504 directly to the tablet 506 or directly to the mobile phone 508.

In step 518, a long range session is initiated between the ATM 502 and the tablet 506 or the mobile phone 508 using the session ID received by the smart watch 504 in step 514. The long range session may use BLUETOOTH, 802.11 (Wi-Fi), Wi-Max, dedicated close range communication (DSRC), or other suitable protocol. The long range session is a secure connection in that data may be encrypted to prevent fraud or theft. At this point, access to financial records or funds is not permitted.

In step 520, the long range session is used to operatively couple a graphical user interface (GUI) of the tablet 506 or the mobile phone 508 with the ATM 502. The GUI of the in-vehicle tablet 506 may prompt a passenger in the vehicle to enter a personal identification number (PIN) and along with the session ID and banking information such that the ATM 502 grants the tablet 506 or the mobile phone 508 access to financial records. Here, the passenger may enter a command for the ATM 502 using the GUI of the tablet 506 or the mobile phone 508.

In step 522, the session is terminated without a request to withdraw funds from the ATM 502. The termination may include entry of a command to terminate the session on the GUI of the tablet 506 or the mobile phone 508, a signal from the vehicle specifically from a brake pedal sensor indicative of removal of force on the brake pedal while a transmission of the vehicle is in a drive mode, a signal indicative of movement of a transmission gear selector from park to drive, or a speed sensor of the vehicle exceeding a threshold (e.g., 3 mph or 5 mph), or determination that the GPS coordinates of the watch, phone, or tablet have moved to a distance far from the external ATM and the general bank property or ATM hosting property.

In step 524, the session is terminated with a request to withdraw funds from the ATM 502. The termination may include entry of a command to withdraw funds and terminate the session on the GUI of the tablet 506 or the mobile phone 508. Upon receiving this command, the ATM 502 may retain the funds within the ATM 502 pending step 526. In the event that the termination is not a command based termination, such as a signal from a brake pedal indicative of removal of force on the brake pedal while a transmission of the vehicle is in a drive mode, a signal indicative of movement of a transmission gear selector from park to drive, or a speed sensor of the vehicle exceeding a threshold (e.g., 3 mph or 5 mph), or GPS coordinates from the portable devices that are inconsistent with being on the property hosting the ATM, then the ATM 502 may retain the funds, cancel the withdraw command, and terminate the session.

In step 526, upon the ATM 502 receiving a command to withdraw funds from the GUI of the in-vehicle tablet 506, the ATM 502 may enter that command and prepare to release the funds. The ATM 502 although prepared to release the funds, the ATM 502 may retain the funds securely until the ATM 502 receives a NFC signal from the smart watch 504 that initiated the session. Upon receiving the NFC signal from the smart watch 504, the ATM 502 may release the funds.

Figure 6:
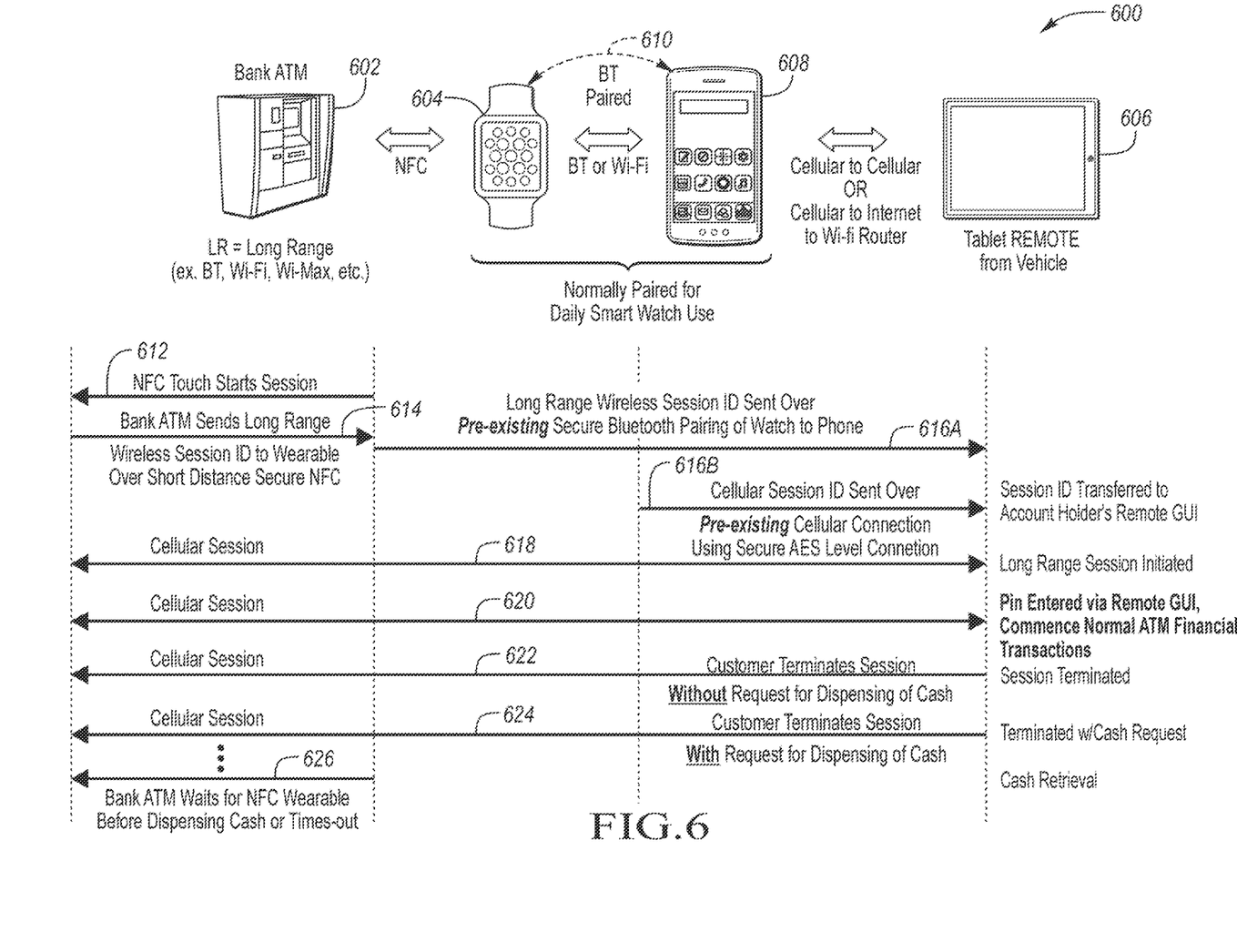
FIG. 6 is a communication flow diagram of a graphical user interface for a nomadic remote tablet or phone based ATM using a wireless communication system, a phone, and a wearable.

FIG. 6, is a communication flow diagram of an in-vehicle graphical user interface for a remote automated teller system (ATM) using a wireless communication system. The wireless communication system 600 includes multiple wireless interfaces and transceivers such as NFC, BLUETOOTH, IEEE 802.11 (Wi-Fi), and cellular transceivers. The communication system 600 allows a bank ATM 602 to be coupled with a nomadic device, shown here as a smart watch 604 that may then be directly coupled with another nomadic device remote from the vehicle such as a tablet 606. Alternatively, the smart watch 604 may be coupled with a mobile phone 608. The smart watch 604 and the mobile phone 608 may be paired such that communication 610 occurs directly. Alternatively, the smart watch 604 may communicate with the tablet 606 via cellular or via Wi-Fi system. Again, similar to the system shown in FIG. 5, the system shown here in FIG. 6 does not directly involve the vehicle mounted center screen and therefore offers new advantages such as the ability to operate the in-vehicle remote ATM from a $2^{nd}$ or $3^{rd}$ row seating position or from any vehicle, new or old, regardless if the vehicle is sold or equipped with the in-vehicle ATM. However, the system of FIG. 6 has one additional benefit by having connectivity between the wearable 604 and/or phone 608 via a cellular link to the tablet 606 or another phone. This allows the account holder to perform the transaction from a distance remote location while sending a $2^{nd}$ party to the physical ATM location. Such arrangements could allow, for example, a bed-ridden or non-mobile person to maintain privacy of their banking credential when having an aid or hired help go to the ATM to make deposits or withdrawals.

In step 612, a nomadic device such as the smart watch 604 is placed in close proximity to the ATM 602. The close proximity is a close range such as 10 cm or some length less than 20 cm, in some embodiments, the close range may be 5 cm or less. When the smart watch 604 is placed within this close range, an NFC based communication session may be initiated. The initiation may include the smart watch 604 sending identifying information to the ATM 602.

In step 614, the ATM 602 sends a long range session ID to the smart watch 604 over the close range communication protocol. The long range session ID may include a session key, a secure URL, an encrypted message, or other data to assist in forming a secure connection between the remote tablet 606 and the ATM 602. In step 616, the long range session ID is sent by the smart watch 604 or the mobile phone 608 directly to the tablet 606 via a cellular network or a Wi-Fi system.

In step 618, a long range session is initiated between the ATM 602 and the tablet 606 or the mobile phone 608 using the session ID received by the smart watch 604 in step 614. The long range session is intended to use a cellular connection in this use case scenario but may also use BLUETOOTH, 802.11 (Wi-Fi), Wi-Max, dedicated close range communication (DSRC), or other suitable protocol. The long range session is a secure connection in that data may be encrypted to prevent fraud or theft. At this point, access to financial records or funds is not permitted.

In step 620, the long range session is used to operatively couple a graphical user interface (GUI) of the tablet 606 or the mobile phone 608 with the ATM 602. The GUI of the remote tablet 606 may prompt a passenger in the vehicle to enter a personal identification number (PIN) and along with the session ID and banking information such that the ATM 602 grants the tablet 606 access to financial records. Here, the passenger may enter a command for the ATM 602 using the GUI of the tablet 606.

In step 622, the session is terminated without a request to withdraw funds from the ATM 602. The termination may include entry of a command to terminate the session on the GUI of the tablet 606. If other signals are used, such as a signal from the vehicle specifically from a brake pedal sensor indicative of removal of force on the brake pedal while a transmission of the vehicle is in a drive mode, a signal indicative of movement of a transmission gear selector from park to drive, or a speed sensor of the vehicle exceeding a threshold (e.g., 3 mph or 5 mph), then the customer shall be prompted since these signal may have no relevance to the ATM transaction if they are in a distance vehicle while a $2^{nd}$ party is at the property of the physical ATM with the NFC wearable.

In step 624, the session is terminated with a request to withdraw funds from the ATM 602. The termination may include entry of a command to withdraw funds and terminate the session on the GUI of the tablet 606. Upon receiving this command, the ATM 602 may retain the funds within the ATM 602 pending step 626. In the event that the termination is not a command based termination, such as a signal from a brake pedal indicative of removal of force on the brake pedal while a transmission of the vehicle is in a drive mode, a signal indicative of movement of a transmission gear selector from park to drive, or a speed sensor of the vehicle exceeding a threshold (e.g., 3 mph or 5 mph), the ATM 602 may retain the funds and the user shall be alerted. If the user, or user's designated courier does not respond within a specified duration, then the ATM shall cancel the withdraw command, and terminate the session.

In step 626, upon the ATM 602 receiving a command to withdraw funds from the GUI of the remote tablet 606, the ATM 602 may enter that command and prepare to release the funds. The ATM 602 although prepared to release the funds, the ATM 602 may retain the funds securely until the ATM 602 receives a NFC signal from the smart watch 604 that initiated the session. Upon receiving the NFC signal from the smart watch 604, the ATM 602 may release the funds.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automated teller machine (ATM) comprising:
a loop antenna and a nearfield communication (NFC) transceiver coupled with the loop antenna; and
a controller configured to,
transmit via the NFC transceiver a session key in response to receiving a signal from a nomadic device, wherein the loop antenna is configured to aid in formation of inductive coupling between the NFC transceiver and a remote NFC transceiver in the nomadic device,
establish a connection with a vehicle infotainment system (VIS) using the session key, wherein the connection includes a cellular connection, a Wi-Fi connection or a BLUETOOTH connection,
receive from the VIS, a personal identification number (PIN) and a request to dispense funds via the connection, and
inhibit release of the funds until a confirmation is received via the NFC transceiver from the nomadic device.

2. The automated teller machine of claim 1, wherein the loop antenna is configured to inductively couple the NFC transceiver with the remote NFC transceiver at a distance no greater than 10 cm.

3. The automated teller machine of claim 1, wherein the controller is further configured to establish a secure connection with a remotely located nomadic device graphical user interface (GUI) GUI using the session key and receive from the nomadic device GUI, a PIN and a request to dispense funds via the secure connection.

4. The automated teller machine of claim 3, wherein the secure connection is via a cellular connection or a Wi-Fi connection.

5. A method of operating an automated teller machine (ATM) from a vehicle infotainment system (VIS) comprising:
by a controller,
transmitting a session key, via inductive coupling, from the ATM to a nomadic device paired with the VIS and proximate with the ATM;
establishing a connection between the ATM and the VIS using the session key, wherein establishing the connection between the ATM and the VIS is via a radio frequency (RF) transceiver configured to form a wireless connection with a remote system separate from the inductive coupling, and wherein the RF transceiver is configured to form the wireless connection with a remote RF transceiver at a distance from the ATM of greater than 1 meter;
receiving a request to dispense funds from the VIS; and
inhibiting release of the funds until reception of a confirmation from the nomadic device while proximate to the ATM.

6. The method of claim 5, wherein transmitting the session key is via a close range RF protocol between the ATM and the nomadic device.

7. The method of claim 6, wherein establishing the connection between the ATM and the VIS is via a radio frequency (RF) transceiver at frequencies greater than 400 MHz and the close range RF protocol is at a base frequency less than 100 MHz.

8. A vehicle infotainment system comprising:
a display;
first and second wireless transceivers; and
a controller configured to, upon receiving an NFC generated session key from a paired device via the first wireless transceiver, establish a secure link via the second wireless transceiver with a banking system using the session key, and operate a graphical user interface on the display to receive a PIN number to authorize access to a bank account.

9. The vehicle infotainment system of claim 8, wherein the first wireless transceiver operates in a frequency range different from the second wireless transceiver.

10. The vehicle infotainment system of claim 8, wherein the first wireless transceiver operates separately from the second wireless transceiver.

11. The vehicle infotainment system of claim 8, wherein the first wireless transceiver is a BLUETOOTH transceiver and the second wireless transceiver is a mobile phone wireless transceiver.

12. The vehicle infotainment system of claim 8, wherein the first wireless transceiver is a BLUETOOTH transceiver and the second wireless transceiver is a Wi-Fi wireless transceiver.

13. The vehicle infotainment system of claim 8, wherein the second transceiver is a radio frequency (RF) transceiver configured to form a wireless connection with the banking system separate from a connection between the paired device and the bank account.

14. The vehicle infotainment system of claim 13, wherein the RF transceiver is configured to form the wireless connection with another remote RF transceiver of an automated teller machine (ATM) at a distance of greater than 1 meter.

15. The vehicle infotainment system of claim 8, wherein the controller is further configured to send a request for funds to the banking system via the second wireless transceiver.

16. The vehicle infotainment system of claim 8, wherein the controller is further configured to send a termination signal to the banking system in response to a vehicle speed exceeding a threshold.

17. The vehicle infotainment system of claim 8, wherein the controller is further configured to send a termination signal to the banking system in response to a transmission shifter leaving PARK.

18. The vehicle infotainment system of claim 8, wherein the controller is further configured to output the PIN number to the banking system via the second wireless transceiver.

* * * * *